B. Y. BRYANT.
HEADER ATTACHMENT FOR TRACTORS.
APPLICATION FILED JUNE 26, 1916.

Patented July 9, 1918.
3 SHEETS—SHEET 1.

B.Y. Bryant
Inventor

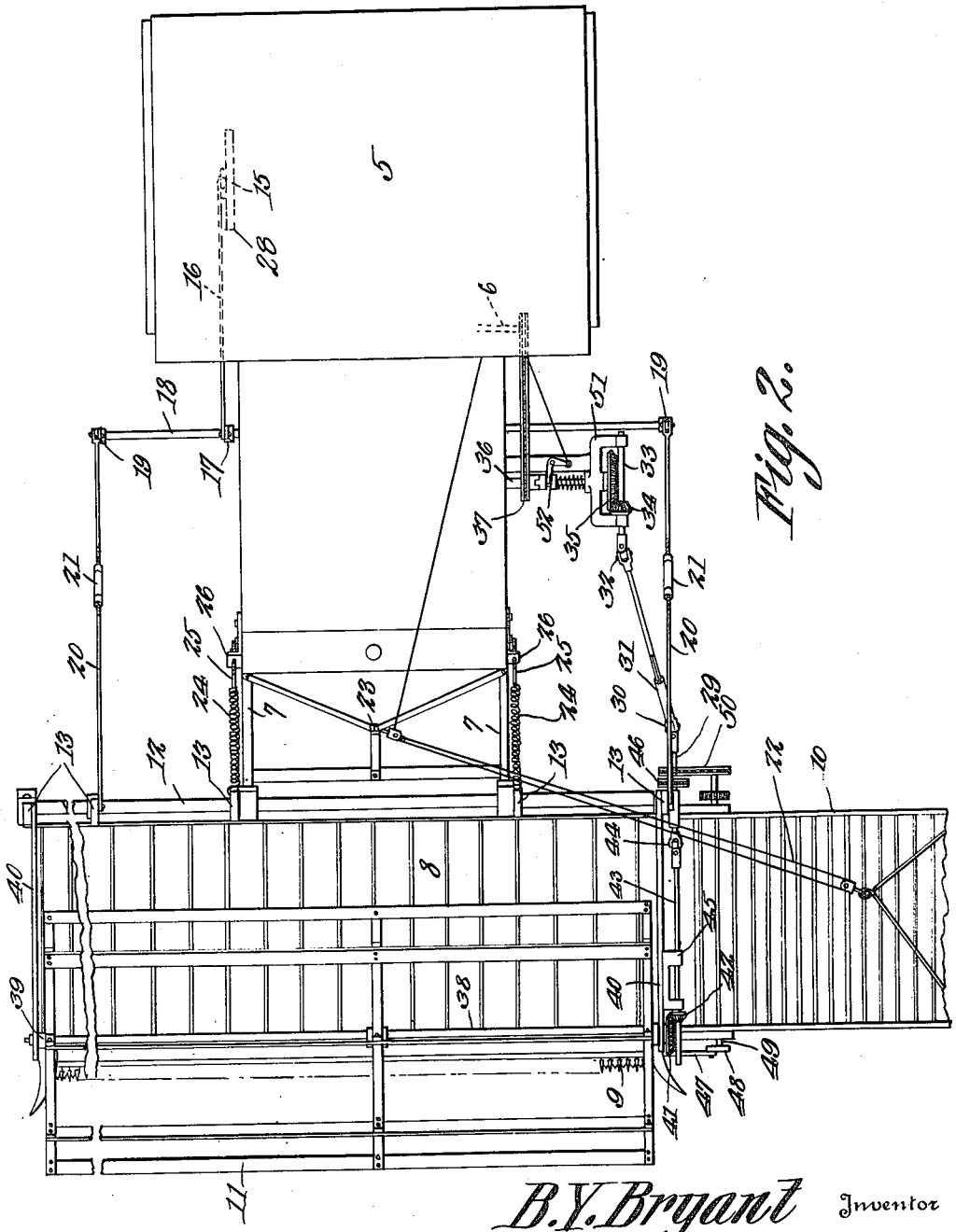

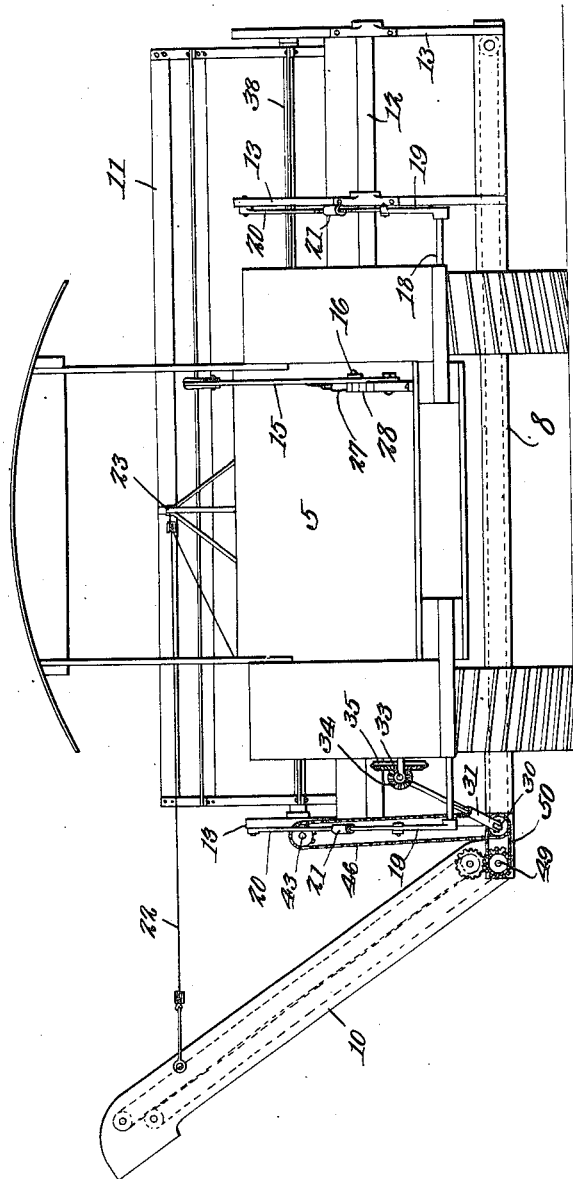

UNITED STATES PATENT OFFICE.

BERTAIN Y. BRYANT, OF HAVILAND, KANSAS.

HEADER ATTACHMENT FOR TRACTORS.

1,271,845.  Specification of Letters Patent.  Patented July 9, 1918.

Application filed June 26, 1916. Serial No. 105,958.

*To all whom it may concern:*

Be it known that BERTAIN Y. BRYANT, a citizen of the United States, residing at Haviland, in the county of Kiowa and State of Kansas, has invented new and useful Improvements in Header Attachments for Tractors, of which the following is a specification.

This invention relates to grain harvesters of the header type, and its object is to provide a simple and efficient structure which enables the same to be readily attached to any ordinary agricultural tractor, and also to provide improved means whereby the header platform may be tilted to operate at different heights without throwing the driving means out of gear.

With the objects stated in view, the invention consists in a novel combination and arrangement of parts to be hereinafter described and claimed, and in order that the same may be better understood, reference is had to the accompanying drawings forming a part of this specification.
In the drawings, Figure 1 is a side elevation of the machine, with the elevator removed;

Fig. 2 is a plan view, and

Fig. 3 is a rear elevation of the machine.
Referring specifically to the drawings, 5 denotes an ordinary agricultural tractor having a shaft 6 which is driven through a suitable gearing by the engine of the tractor, the same not being a part of this invention, in view of which a detailed description is not necessary.

Figure 1:
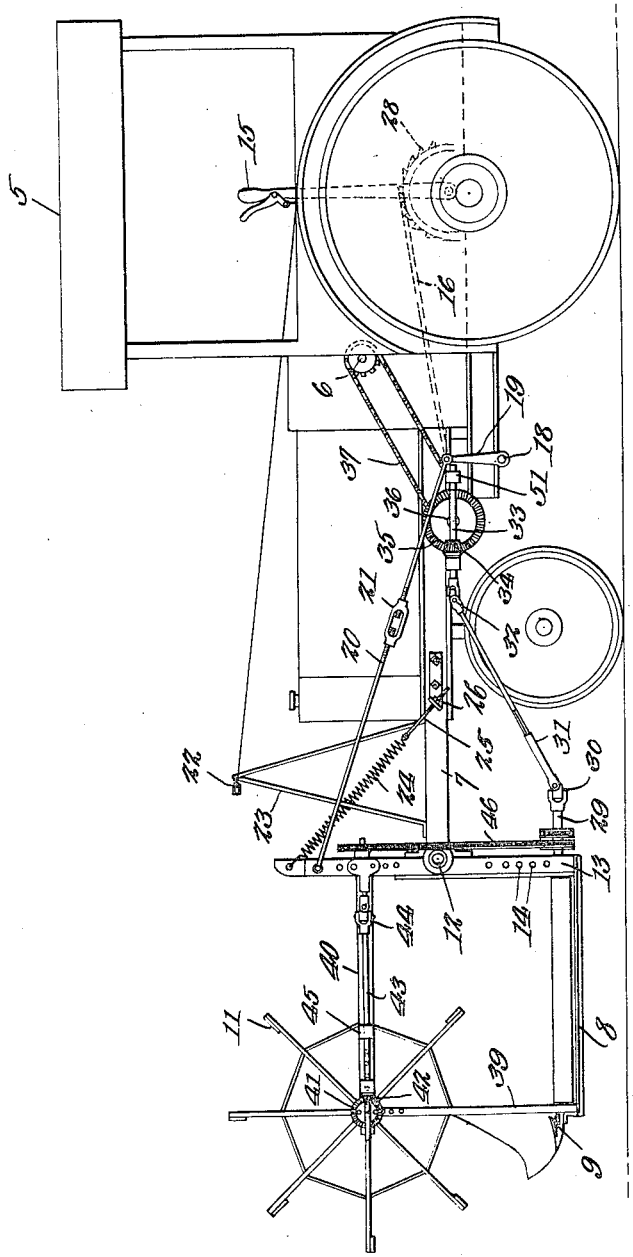

To the sides of the tractor frame are bolted bars 7 which extend forward from the front end of the tractor and form the support of the header, the latter being composed of a platform 8, a reciprocatory sickle bar 9 in front of the platform, a conveyer 10 at one end of the platform, and a reel 11 above the platform, all arranged and operating in the usual manner.

The forward ends of the bars 7 support a transverse horizontal shaft 12 on which are fulcrumed, intermediate their ends, arms 13 carrying at their lower ends the platform 8, the latter being adjustable as to height by providing the arms with a series of bolt holes 14. As the supporting arms 13 are pivoted, the platform 8 may be swung up and down, this adjustment being effected by a hand lever 15 carried by the tractor and having a rod connection 16 with a rocker arm 17 on a shaft 18 carried by the tractor frame and provided with a pair of rocker arms 19 connected by rods 20 to a pair of arms 13, the rods 20 having turnbuckles 21 for adjustment.

The elevator 10 is provided with the usual hoisting gear 22 supported by a stand 23 carried by the bars 7.

The platform 8 is yieldingly supported by means of coiled springs 24 connected at one end to a pair of arms 13 and at their lower ends to the bars 7 by means of adjusting rods 25 carried by brackets 26 mounted on said bars.

The lever 15 has a latch 27 engaging a ratchet sector 28 for holding the lever. The teeth of the sector slope so that the latch is free to slip and allow the lever to swing in one direction, or in a direction to allow the platform 8 to tilt upward. The lever therefore does not lock the platform down, and the latter is free to ride over obstructions.

The sickle bar 9 and all the other working parts of the header are driven from the shaft 6. The discharging end of the platform 8 carries a shaft 29 which is connected by a universal joint 30 to a shaft 31 consisting of two telescopically connected sections, and having a universal joint connection 32 with a short shaft 33 provided with a bevel gear 34 which is in mesh with a bevel gear 35 on a countershaft 36 driven by the shaft 6 through a sprocket-and-chain or other suitable gearing 37. The flexible driving connection between the shafts 29 and 33 is necessary in order that the platform 8 may be tilted.

The reel 11 is carried by a shaft 38 mounted in bearings on vertical and horizontal supports 39 and 40 carried by the platform 8. One end of the reel shaft has a bevel gear 41 which is in mesh with a bevel pinion 42 on a shaft 43 which is in two sections connected by a universal joint 44 and carried by bearings 45 mounted on one of the supports 40. The shaft 43 is connected to the shaft 29 by a sprocket-and-chain gearing 46. It will therefore be seen that the reel is driven by the shaft 29. The shaft 43 is made in flexibly connected sections in order that the reel may be raised and lowered and also set forward and rearward, the pinion 42 being splined on the shaft.

The sickle bar 9 is driven by a pitman 47 connected to a crank 48 on a shaft 49 carried by the platform 8 and driven from the shaft 29 by a sprocket-and-chain or other suitable gearing 50. The conveyer belts are also driven from the shaft 49, a suitable gearing being provided for this purpose.

The shafts 33 and 36 are supported by a bearing bracket 51 carried by the tractor frame, and latter shaft is also provided with a clutch 52 so that the harvesting mechanism may be thrown out of gear.

The attachment is light in weight and it can be easily controlled and readily applied to the tractor, no change in the structure of the latter being necessary.

I claim:

The combination with a tractor, of supporting bars projecting forward from the front end thereof, a transverse shaft carried by said bars, pivoted arms carried by the shaft, a harvesting mechanism carried by the lower ends of the arms, said mechanism comprising a platform, and a sickle bar, a reel and a conveyer carried by the platform, a shaft carried by the platform, a driven shaft on the tractor operatively connected to the platform shaft, a shaft operatively connected to the reel and comprising flexibly connected sections, a driving connection between the last-mentioned shaft and the platform shaft, a second shaft carried by the platform and operatively connected to the first-mentioned platform shaft and to the conveyer, and a driving connection between the sickle bar and the second-mentioned platform shaft.

In testimony whereof I affix my signature.

BERTAIN Y. BRYANT.